Figure 1:
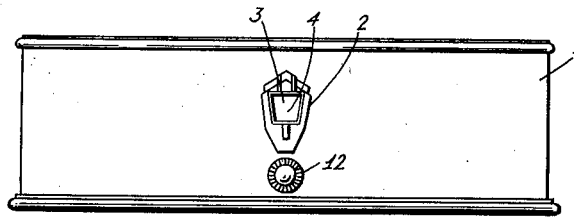

June 13, 1933.                    W. L. DOUDEN                    1,913,977
                                 RADIO INDICATOR
                          Filed Jan. 16, 1930        3 Sheets-Sheet 1

INVENTOR
WILLIAM L. DOUDEN
BY
ATTORNEY

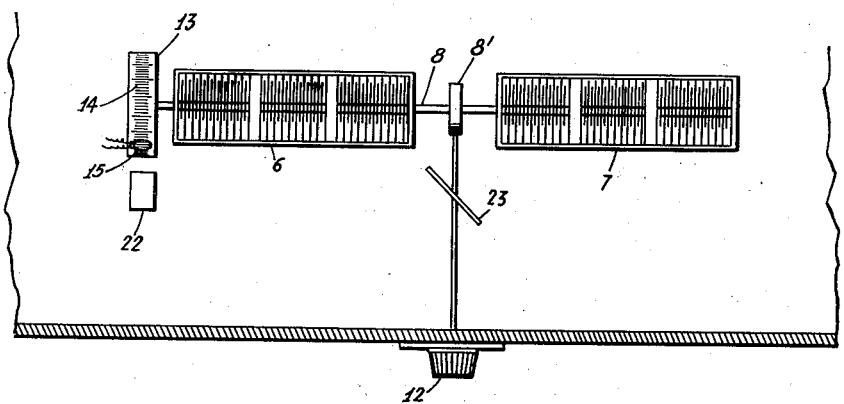
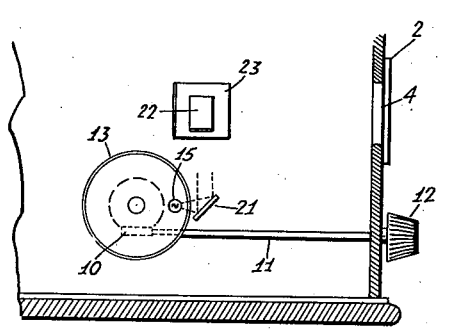
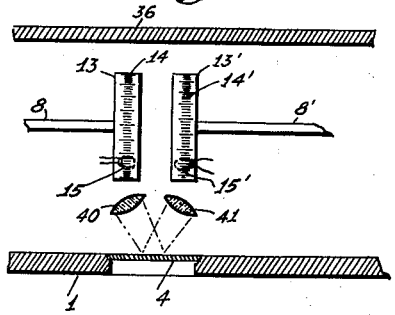
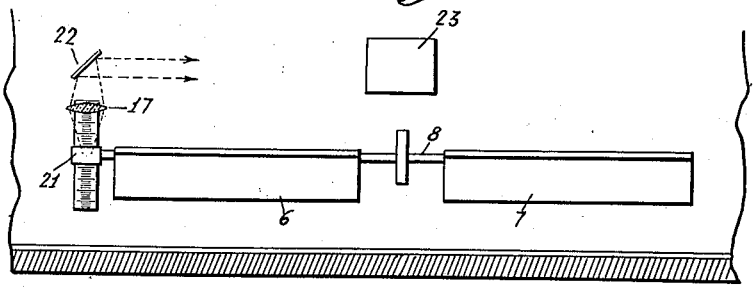

June 13, 1933.  W. L. DOUDEN  1,913,977
RADIO INDICATOR
Filed Jan. 16, 1930   3 Sheets-Sheet 3

INVENTOR
WILLIAM L. DOUDEN
BY
ATTORNEY

Patented June 13, 1933

1,913,977

UNITED STATES PATENT OFFICE

WILLIAM L. DOUDEN, OF NEW YORK, N. Y., ASSIGNOR TO RADIO CORPORATION OF AMERICA, A CORPORATION OF DELAWARE

RADIO INDICATOR

Application filed January 16, 1930. Serial No. 421,126.

My present invention relates to indicating devices, and more particularly to methods of, and means for, indicating adjustments of elements in an electrical apparatus, as a radio receiving set.

It has been the practice, in the prior art, to indicate the adjusted position of the tuning means of a radio receiving apparatus by associating one or more indicating dials or drums with the tuning instrumentality, and then so disposing the dial or drum, relative to the operator of the apparatus, that the operator can directly observe the face of the dial or drum. Thus, in one particular embodiment, the indicating drum was mounted on a shaft, the latter being the rotor shaft of a so-called "gang" of condensers, and the drum positioned in a sight opening of the radio cabinet in such a manner that as the shaft manipulating knob on the cabinet is actuated the drum periphery moves relative to the said opening.

Such prior constructions, although representing improvements over still earlier devices wherein the indicator was made a part of the knob on the exterior of the cabinet, nevertheless possessed inherent mechanical disadvantages. For example the diameter of the drum employed was limited to a definite relation to the size of the observation opening; the width of the drum periphery likewise was subject to proportioning with respect to the opening width. Again the mechanical coupling between the manipulating knob and the tuning instrumentality presented constructional difficulties when it was attempted to dispose the knob at a position on the cabinet wall without considering the relation between the knob and the indicating opening.

Summing up then the greatest disadvantage of such prior art devices lies in the fact that the position of the dial is determined by the position of the observer and the position of the mechanically related parts is largely determined by the position of the dial irrespective of the desirability of the arrangement from the standpoint of mechanical or electrical efficiency or convenience.

Now, I have devised a new method of, and constructed novel embodiments for, indicating the adjusted positions of a concealed electrical instrumentality, as the tuning means of a radio receiver, by utilizing the magnifying phenomenon inherent in the optical projection of images upon a screen. It is, thus, possible to render the positioning of the drum and tuning instrumentality assembly independent of the manipulating knob; similarly, the physical dimensions of the drum or dial and the panel opening dimension are made independent of each other, and the entire layout of the set is rendered independent of the position of the panel opening.

Accordingly, it is one of the main objects of the present invention to provide a method of, and means for, positioning a concealed electrical instrumentality which consists in optically projecting an image of the indicator on an image receiving medium, and then varying the position of the image on the medium to a predetermined point by adjusting the instrumentality.

Another important object of this invention is to provide, in an electrical apparatus including a rotatable indicating means, an image receiving medium, and optical means for projecting an image of said indicating means on said medium.

Another object of the invention is to provide in a radio receiving set, equipped with one or more tuning instrumentalities and a position indicator associated with each instrumentality, a projection screen disposed on the control panel of the set, means for projecting an image of an indicator on said screen, and additional means for imparting color to an image.

Still other objects of the invention are to provide in a radio receiving set equipped with an indicating drum and condenser assembly concealed within the radio cabinet at any convenient location and a driving condenser shaft coupled between the condenser rotors and the manipulating knob on the control panel, a translucent screen disposed on the said panel, and optical means located within the radio cabinet and so positioned relative to the drum that an image of a desired portion of the drum is projected on the screen for indicating an adjusted position of the said rotors, the aforesaid construction thus permitting the use of a drum of any desired size, and at the same time secure any desired openness of scale at the transluscent screen, magnification of the image projected on the screen being dependent upon the characteristics of the optical system employed within the cabinet.

And still other objects of the invention are to improve generally the simplicity and efficiency of broadcast radio receiver dials as they exist in commercial designs at present, and to provide an indicating device or apparatus of this type which is not only durable and reliable in operation, but more economical to manufacture and more ideal in arrangement.

The novel features which I believe to be characteristic of my invention are set forth in particularity in the appended claims, the invention itself, however, as to both its organization and method of operation will best be understood by reference to the following description taken in connection with the drawings in which I have indicated diagrammatically several organizations whereby my invention may be carried into effect.

Figure 2:
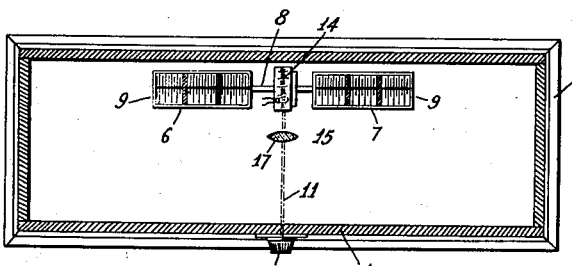
Figure 4:
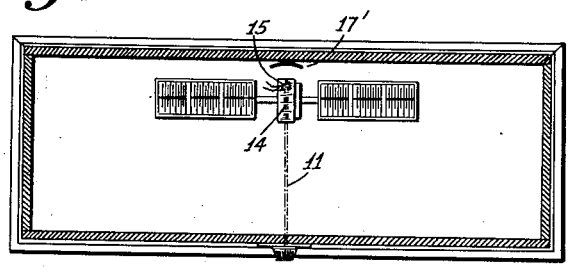
Figure 5:
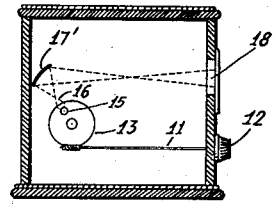
Figure 6:
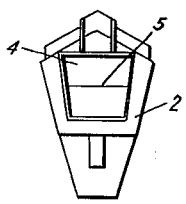
Figure 3:
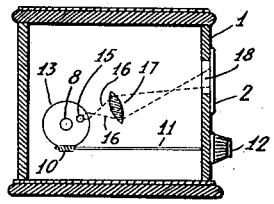
Figure 10:
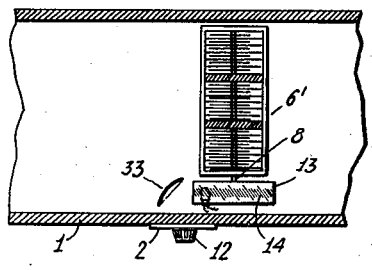
Figure 11:
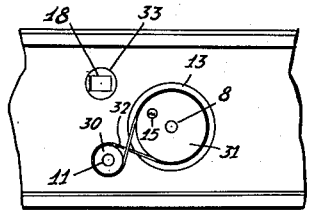
Figure 12:
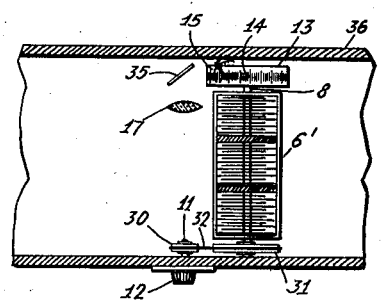
Figure 13:
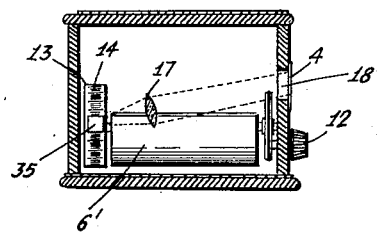
Figure 14:
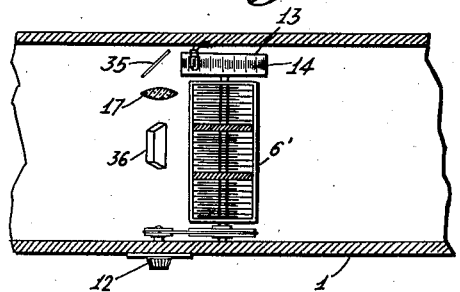
Figure 15:
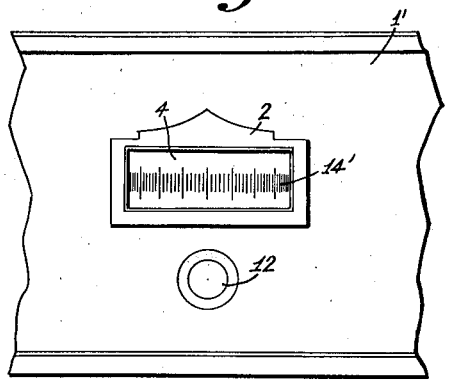

In the drawings,

Fig. 1 is a front view of a radio receiving cabinet showing the control panel thereof, Fig. 2 is a plan view of the cabinet shown in Fig. 1, with the cabinet top removed, Fig. 3 is an end view of the device shown in Fig. 2, a portion of the cabinet being broken away, Fig. 4 is a plan view similar to Fig. 2, a modified type of optical system being shown, Fig. 5 is an end view of the device shown in Fig. 4, a portion of the cabinet being broken away, Fig. 6 is a detailed view of a form of image receiving screen employed on the control panel, Fig. 7 is a plan view of a portion of the interior of a radio receiver, embodying another modified form of the invention, Fig. 8 is an end view of the apparatus as shown in Fig. 7, Fig. 9 is a front view of the apparatus shown in Fig. 7, the control panel being omitted, Fig. 10 is a plan view, a portion of the cabinet being broken away, of still another modified form of the invention, Fig. 11 is a front view of the device shown in Fig. 10, the control panel being removed, Fig. 12 is a plan view of another modified form of the invention, Fig. 13 is an end view of the modified device shown in Fig. 12, Fig. 14 shows in plan view still another modified form of the invention, Fig. 15 is a front view of the control panel employed with the modified device shown in Figs. 7 and 14, Fig. 16 shows a plan view of another modified form of the invention in which more than one indicating drum is employed.

Referring to the accompanying drawings in which like characters of reference indicate the same parts in the different views, there is shown in Fig. 1 the control panel 1 of a radio receiving cabinet, the panel being provided with an escutcheon plate 2 having an opening 3 in which is disposed an image receiving medium such as a translucent screen 4.

The escutcheon 2 may, of course, be of any desired appropriate design, as shown in detail in Fig. 6. Again, a reference, or index, line 5 may be provided across the middle of the screen. The latter may be made of a rigid or flexible material. Preferably a flexible material as celluloid, is utilized.

Within the cabinet, generally denoted as 1a, there is disposed an adjustable instrumentality for tuning, in this case, a radio receiving circuit, the latter not being shown for simplicity of disclosure. Only a pair of ganged condensers 6, 7 is shown, it being understood that each gang of condensers includes a plurality of variable condensers having their stators affixed to a common bathtub housing 9 and their rotors mounted upon a common shaft 8.

As shown in Fig. 3, the shaft 8 is mechanically coupled, as by worm gearing 10 (the gearing on the shaft being omitted, since the construction is well known) provided on a control shaft 11, to a manipulating knob 12, the latter being mounted upon one end of the control shaft 11, and being disposed upon the control panel 1. The knob is preferably disposed immediately beneath the opening 3, although it can readily be located at any other point of the panel. The mechanical coupling between the shaft 8 and the knob 12 would then be somewhat different, it being pointed out that, in such a case, any well known type of coupling could be employed.

When the knob 12 is rotated, the shaft 8 is actuated either in a clockwise or counterclockwise direction, thereby changing the capacity of the circuits connected to the condensers in a manner well known to those skilled in the art. To indicate the position of the rotors of the condensers, an indicating drum is rigidly mounted upon the shaft 8 at a point intermediate the gangs 6 and 7, and central of the screen 4.

The periphery of the drum 13 is provided with lateral scale slits 14, for designating station positions of the receiver. Each slit is of narrow width and extends somewhat across the drum periphery, as shown in Fig. 2. A small incandescent lamp bulb 15 is disposed adjacent the interior surface of the drum periphery, as shown in Fig. 3, and its rays 16 pass through the slits 14, it being understood that the drum is preferably made of an opaque material, such as aluminum, opaque celluloid and the like. The bulb 15 is, of course, fixed relative to the drum which rotates about axis 8.

A lens 17 is disposed between the outer surface of the drum periphery and the screen 4. It will be noted that a magnified image 18, of a portion of drum 13, is projected upon the screen 4. It should also be noted that as the knob 12 is rotated in either right or left direction, the image 18 remains the same length; but of course, the graduations, which may also have associated therewith number slits, shift from the lowest to the highest numerals and vice versa. The index line 5 is provided on the screen 4, in order to facilitate adjusting the rotor shaft 8 to any desired station receiving position. Thus, when a desired numbered graduation slit 14 on the drum 13 appears superposed on the line 5 of the screen it will be known that the condensers are set at the desired position corresponding to a predetermined desired station.

It will be noted that the entire drum and condenser assembly is removed, by the aforedescribed construction, to a convenient location remote from the indicating screen 4, so that the shaft 8 of the rotors can be disposed in any desired position relative to the indicator opening or the control shaft 11. It will also be seen that by my arrangement a translucent screen is provided in the aperture of the panel, and an image of the scale on the drum periphery is projected thereon, by a lens located at an appropriate position. This construction thus permits the use of a drum of any desired size, and, furthermore, permits the disposition of the drum in such a manner that it is situated considerably beneath the lowest point of the escutcheon opening 3.

That is to say, while the drum is located centrally of the opening, it does not necessarily have to be in alignment therewith, thereby resulting in a freedom of construction design which is very important to the commercial production of the set. At the same time there is secured any desired openness of scale at the translucent screen, as the magnification of the scale image is obviously in proportion to the distances from the screen to the lens 17 and from the lens to the drum periphery.

In Fig. 4 there is shown a modified form of the indicating system disclosed heretofore, this system including a concave reflector 17' which takes the place of the lens 17. The elements heretofore described are the same in Figs. 4 and 5, the incandescent lamp bulb 15 being disposed immediately behind the inner surface of the periphery of drum 13. In this case, however, the bulb 15 is disposed somewhat to the rear of the drum periphery in such a manner that rays from the bulb pass through the slits 14 formed in the periphery of the drum, as heretofore described.

The concave reflector 17' is disposed in substantial alignment with the screen 4, and is not disposed between the outer surface of the periphery and the screen as in the case of Fig. 3. In this modified form, however, magnification of the scale image is secured, an image 18 being projected upon the screen 4, it being understood that this image is substantially of greater length than the arc of the drum periphery subtended by the rays 16 from the bulb 15.

The concave reflector 17' is disclosed as a substitute for the lens 17, and may be employed in situations where an arrangement is desired which will possess all the attributes and advantages of the use of a lens, yet where it is desired to maintain the screen free space between the drum and the screen free of any extraneous obstructions. The action and operation of the system is otherwise analogous to that shown in Fig. 3, the screen 4 being provided with an index line 5 in this case.

In Figs. 7, 8 and 9 I have shown a modified form of the optical indicating system disclosed heretofore, in which system an image of the scale is projected upon the screen 4 by a lens 17 with the assistance of plane reflectors 21, 22, 23. In this modification the control panel is provided with a knob 12 connected to a control shaft 11, the latter being mechanically coupled by means of a volute gear 10 to the common gang condenser shaft 8, the volute gear being mechanically coupled to the shaft through a gear 8' rigidly affixed to the shaft 8.

The indicating drum 13, in this modification, is affixed to an end of the shaft 8 projecting beyond one end of the bathtub housing of the gang of condensers 6. An incandescent lamp bulb 15 is disposed immediately adjacent the interior surface of the periphery of drum 13, as shown in Fig. 8, and the rays therefrom passed through the scale slits 14 provided in the periphery of the drum.

These rays pass through some of the slits which are positioned adjacent the bulb 15 and impinge upon the reflecting surface of the plane reflector 21. The rays are reflected from the surface of the reflector 21 and then passed through a lens 17, the latter being positioned between reflector 21 and a second plane reflector 22. A third reflector is positioned in alignment with the screen 4 on the control panel, and at such an angle to the plane reflector 22 that the rays of light forming the image scale reflected from the mirror 22 are projected upon the reflecting surface of the reflector 23 and then reflected therefrom on to the screen 4 in substantially magnified condition.

It will be observed that the advantage of this construction, that is to say, an optical system which includes reflecting means as well as lenses, enables a set to be produced in which the drum need not be disposed in alignment with the escutcheon, nor centrally located thereof, but in which case the drum may be disposed at one end of the rotor shaft. The operation of this modification is substantially the same as the operation of the two modifications heretofore described, the elements employed being the same, except wherein otherwise denoted by different reference numerals.

In the embodiments heretofore described the condenser rotor shaft 8 has been shown as being arranged in substantial parallelism with the length of the control panel 1. In Figs. 10 and 11, I have shown an arrangement in which the shaft 8 is disposed normal to the control panel 1, the manipulating knob 12 being disposed, as shown heretofore, below and central of the escutcheon 2. In this arrangement, however, the control shaft 11 is mechanically coupled to the shaft 8 by means of a belt and pulley connection, a small pulley 30 being mounted on the control shaft 11, while a larger pulley 31 is mounted on the shaft 8, the pulleys being connected by a flexible belting 32 in figure-of-eight fashion.

In this modification the drum 13 is mounted on one end of the shaft 8, the shaft projecting beyond the end of the bathtub housing 6' closest the control panel, whereby the drum is disposed in substantial parallelism to the control panel.

In this type or arrangement the scale slits 14 are arranged at an angle to the axis of rotation of the drum, there being an incandescent lamp bulb 15 disposed immediately behind the interior surface of the periphery of drum 13, the rays from the bulb passing through the slits positioned immediately above the bulb and impinging upon a concave reflector 33, whereby a magnified image of the scale graduations, immediately above the bulb 15, is projected upon the screen 4. The reflector 33 is so designed, and so arranged relative to the angularly disposed scale graduations that an image 18 is formed on the reflecting surface of the reflector 33 which is normal in appearance.

That is to say, reference being had to Fig. 11, the graduations are shifted about an optical axis so that an image is thrown upon the screen which makes it appear that the scale graduations on the periphery of the drum are parallel with the axis of rotation of the drum, rather than angularly disposed thereto, as shown in Fig. 10. It will be obvious that this arrangement offers another source of freedom in commercial set design which will prove of value when space within the cabinet is at a premium.

It may be desired to retain the compact arrangement of the bathtub gang of condensers 6' as shown in Fig. 10, and yet not dispose the drum adjacent the control panel. In such a case, the modification shown in Figs. 12 and 13 will prove of value in designing the set. In this modification the pulley and belt drive disclosed in Fig. 11 is retained, the drum 13 being mounted, however, on the end of the shaft 8 which projects from the end of the bathtub housing 6' adjacent the rear panel of the cabinet. The scale graduation slits 14 are provided on the drum periphery, and the bulb 15 is disposed adjacent a portion of the interior surface of the periphery as in the case of Fig. 10. A plane reflector 35 is disposed adjacent the rear panel 36, and at an angle thereto so that rays which pass through a portion of the scale slits are reflected from its surface and projected upon a lens 17 disposed between the plane reflector 35 and the screen 4.

The lens 17 is disposed in the aforementioned intermediate position, but is tilted at an angle to a line normal to the base of the cabinet in such a manner that the scale image is projected upon the screen 4 as a substantially magnified image 18. It will thus be seen that in this modification the good features secured by the use of a reflector and lens are taken advantage of in disposing the indicating drum at the rear of the cabinet.

In each of the modifications described above the image projected on the screen 4 was such that the scale graduations are positioned parallel to the base of the cabinet. That is to say, when the knob 12 is actuated in any of the aforegoing modifications the scale graduations on the screen 4 appear to move from the top of the cabinet downwards to the base thereof, or vice versa.

An optical system can be arranged, with the members of the modification shown in Fig. 12, such that the scale graduations apparently shift from side to side on the screen when the knob 12 is actuated instead of shifting vertically. This may be accomplished by disposing a reversing prism 36 between the lens 17 and the screen 4. The reflecting surface of this prism is arranged at an angle of 45° to the horizontal, and this serves to rotate the entire beam through an angle of 90° on its own axis in the manner well known in the optical art, with a corresponding change in the apparent direction of motion as well as the apparent position of the graduations on the scale.

Fig. 15 shows the images 14' formed on the screen 4 of the scale slits 14, in this modification.

It is desired in some types of radio receiving sets, such as a superheterodyne receiver, to employ two control knobs on the control panel 1. As shown in Fig. 16, one shaft 8 is connected to one gang of condensers, the construction of which is not shown, but which is to be understood to be of the same type as shown in Fig. 10 for example. Mounted upon one end of the shaft is an indicating drum 13 which is provided with a plurality of scale graduation slits 14, as in the modifications hitherto described.

In alignment with the shaft 8 there is provided a second rotor shaft 8' upon which is mounted (not shown) the rotors of a second gang of condensers. The end of this shaft has affixed thereto a second indicating drum 13', also provided with scale graduation slits 14'. Both drums have a common axis of rotation, although mounted physically upon different shafts. An incandescent lamp bulb 15 is disposed adjacent a portion of the interior surface and the periphery of the drum 13, and a second bulb 15' is disposed adjacent the drum 13' in an analogous position.

A lens 40 is disposed between the periphery of the drum 13 and the screen 4, arranged as shown in the modifications described heretofore, while a second lens 41 is positioned between the periphery of the drum 13' and the screen 4. The magnified images are projected upon the screen 4 from the portions of the drum peripheries upon which the rays from the bulb 15 and 15' fall, in such a manner that the scales appear adjacent each other; or, if desired, the lenses 40 and 41 may be so adjusted relative to the screen 4 that the images appear to be superposed upon each other. Again, the bulb 15 may be colored red, while the bulb 15' another color such as blue or green.

As many dials or drums as desired, may be employed, and the images may be segregated at the screen 4, by the use of diaphragms adjacent to the dials so that the several scales will lie parallel; or if preferred, the images are superposed, and each is identified by providing the bulbs with differently colored lights. For example, one scale may be illuminated by a red light, a second by a blue or yellow light and a third by green. It also adds to the convenience of the arrangement when differential coloring is employed for the scales to differentially color the control knobs of the several dials.

While I have indicated and described several systems for carrying my invention into effect, it will be apparent to one skilled in the art that my invention is by no means limited to the particular organizations shown and described, but that many modifications in the circuit arrangements, as well as in the apparatus employed, may be made without departing from the scope of my invention as set forth in the appended claims.

What I claim is:

1. In a radio receiving set a gang of variable condensers a position indicator on the common rotor shaft of said variable condensers, a projection screen on the control panel of said set, said screen being disposed above said condensers and indicator, optical means independent of the indicator for projecting an image of said indicator on said projection screen, and a tuning knob, operatively associated with said shaft, disposed on said panel in alignment with said screen.

2. In a radio receiving apparatus comprising a gang of condensers, a drum dial mounted on the common rotor shaft thereof and having its axis perpendicular to the control panel of said apparatus, a projection screen on said control panel disposed above said axis reflecting means for projecting an image of said dial on said screen, and a tuning knob on the panel mechanically connected to the rotor shaft for actuation thereof.

3. In a radio receiver cabinet, a gang condenser, a drum indicator mounted on the common rotor shaft of the condenser and having a horizontal axis of rotation, a projection screen so located on the control panel of the cabinet as to be readily visible to the operator of said receiver, an optical system for projecting and simultaneously rotating the image of said drum on said screen, whereby the image of said drum on said screen moves laterally thereacross on rotation of said drum, and a tuning knob, arranged centrally of the screen, for rotating the drum.

4. In a radio receiver cabinet, a variable condenser, a drum indicator mounted on the rotor shaft thereof and having an axis of rotation, a projection screen located on the control panel of the cabinet in a plane parallel with said axis, an optical system for projecting and simultaneously rotating the image of said drum on said screen, whereby the image of said drum on said screen moves laterally thereacross on rotation of said drum, and a tuning knob, in alignment with the screen, for actuating the rotor shaft.

5. In a radio receiving set comprising rotatable tuning elements, a rotatable position indicator for said tuning elements, a projection screen on the control panel of the set disposed out of alignment with the tuning elements and indicator, means for projecting an image of said indicator on said projection screen, optical means for rotating the image so that its apparent movement will be in a desired direction, and manually controllable means on the panel for varying the position of said indicator.

6. In an electrical apparatus including a plurality of rotatable indicating means, a projection screen, and means for projecting differentially colored images of said indicating means on said screen.

7. In a radio receiving set comprising rotatable tuning elements, a rotatable position indicator for said tuning elements, a translucent projection screen, means for projecting a colored enlarged image of said indicator on said screen, and means coupled to said elements for shifting said image on said screen in a direction normal to the axis of rotation of said position indicator.

8. A method of positioning at least two tuning shafts housed within a radio cabinet from a point on the exterior of the cabinet which consists in optically projecting differentially colored images of the indicators associated with the tuning shafts on an image receiving screen, and then varying the position of at least one of the images on the screen to a predetermined point by adjusting at least one of the tuning shafts.

9. A radio receiver comprising a cabinet provided with a control panel, a variable condenser assembly within the cabinet, a tuning knob on the panel, an indicator mounted on the rotor shaft of the assembly, a translucent screen disposed on the panel, said screen and indicator being out of alignment, said knob being arranged centrally of said screen, driving means between said shaft and knob, and optical means within said cabinet so positioned relative to the indicator and screen that an image of a desired portion of the indicator is projected on the screen for indicating an adjusted position of said condenser.

10. In a radio receiving set comprising rotatable tuning elements, a pair of position indicators for said tuning elements, a control panel, a translucent screen disposed on said panel, means for producing differentially colored images of said indicators on said screen, and a tuning knob mechanically coupled with said tuning elements for adjustment thereof disposed on said panel.

11. In a radio receiver, a plurality of adjustable station indicators, said indicators being positioned adjacent one another, a control panel, a screen therein, means for producing differentially colored images of the indicators on the screen, and manually controllable means on the panel for actuating said indicators.

12. In a radio receiver, a pair of adjustable station indicators, said indicators being positioned adjacent one another, a control panel, station indications provided on each of said indicators, and means for illuminating said indicators in such a manner that station indications on one of said indicators appear differently colored from the station indications on the other indicator when viewed from the control panel.

13. A radio receiver comprising a cabinet provided with a control panel, a variable condenser assembly within the cabinet, a tuning knob on the panel, an indicator mounted on the rotor shaft of the assembly, a translucent screen disposed on the panel, said screen and indicator being out of alignment, said knob being arranged centrally of said screen, driving means between said shaft and knob, and reflecting means within said cabinet so positioned relative to the indicator and screen that an image of a desired portion of the indicator is projected on the screen for indicating an adjusted position of said condenser.

14. In a radio receiver including at least two receiver control means, each of said means being provided with a rotatable indicating means, a translucent screen common to both indicators, and means, including illuminating means, for producing on said screen differentially colored images corresponding to the positions of said indicating means.

15. In a radio receiver including a plurality of adjustable receiver control means, a rotatable circular indicating means mechanically coupled to each control means, translucent screen means disposed on one side of, and spaced from, said indicators, and means, including a source of illumination on the opposite side of each of said indicating means, for producing on said screen means differentially colored images corresponding to the positions of said indicating means.

WILLIAM L. DOUDEN.